June 27, 1939.  C. KELLER  2,164,000
PLANT FOR THE INVESTIGATION OF HYDRAULIC MACHINES
Filed Feb. 4, 1937
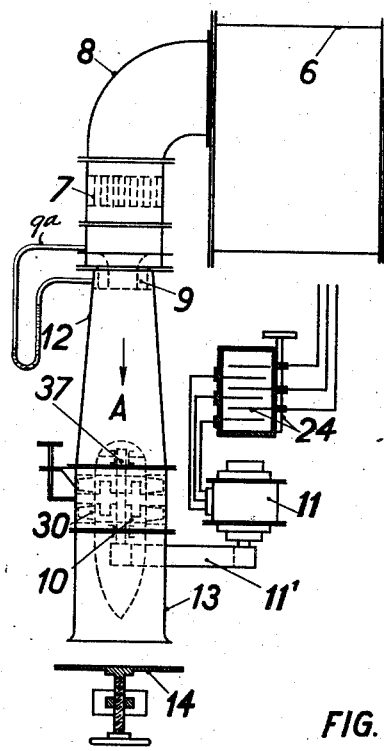
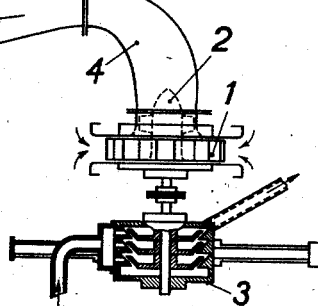
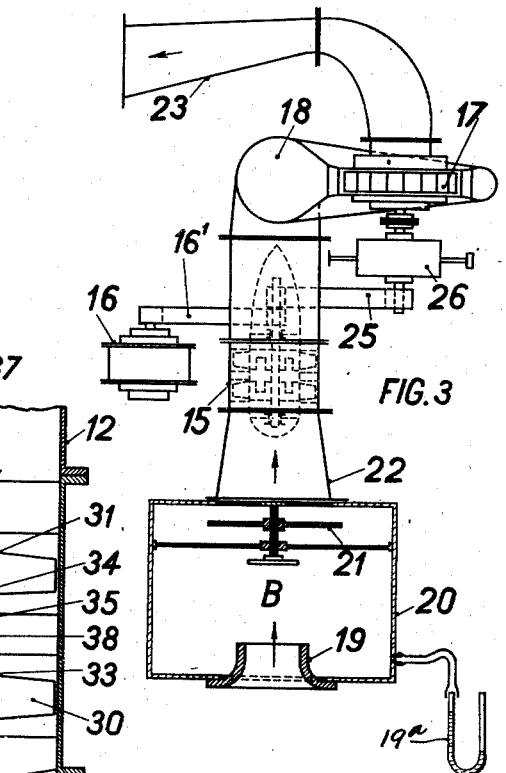
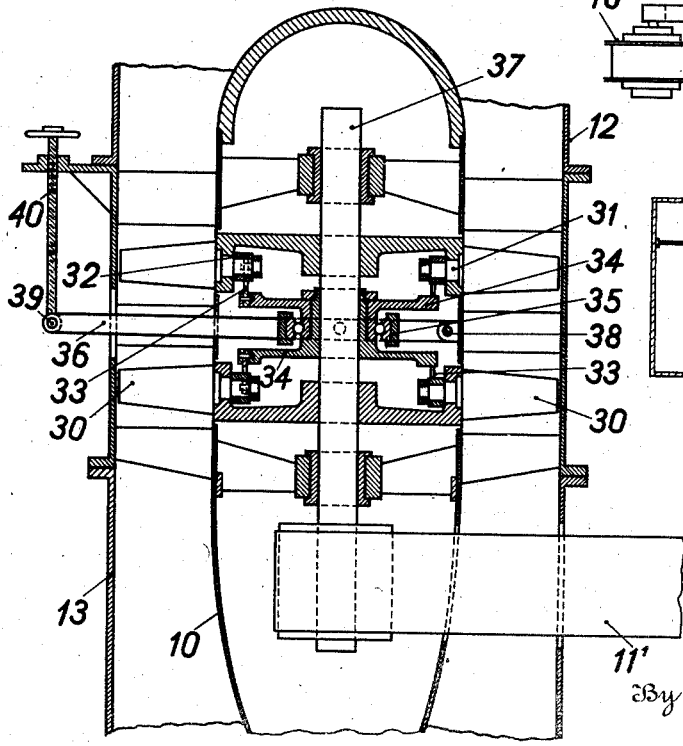
Inventor
Curt Keller
By Dodge &c.
Attorneys Patented June 27, 1939

2,164,000

UNITED STATES PATENT OFFICE 2,164,000

PLANT FOR THE INVESTIGATION OF HYDRAULIC MACHINES

Curt Keller, Zurich, Switzerland, assignor to Escher Wyss Maschinenfabriken Aktiengesellschaft, Zurich, Switzerland, a corporation of Switzerland Application February 4, 1937, Serial No. 124,109 In Switzerland February 17, 1936

4 Claims. (Cl. 73—51)

The investigation of hydraulic machines, particularly of water turbines and models thereof, is ordinarily carried out on special test benches in laboratories, a certain quantity of water being supplied, by means of pumps, to the turbine to be investigated and usually circulated in a closed cycle. Such testing arrangements, however, are decidedly expensive to work, inasmuch as a large and heavy mass of water has to be circulated. Added to this is the fact that when it is necessary to arrange the turbine shaft vertically, erection is both tedious and difficult, and the insertion and removal of wheels and the fitting of the suction pipe below the rotor wheel are particularly troublesome, so that when changes have to be made much time is lost and, in consequence, considerable expense is involved. Also, when using water as the working medium, it is practically impossible to carry out accurate measurements of pressure and velocity in front of, behind and in the rotor wheel. Finally, the heads of water available are mostly small so that only comparatively small brake horsepowers can be obtained.

Now it is known that, as regards flow phenomena in the subsonic range, i. e., speed range below that of sound, and up to comparatively high velocities, air and other gases behave very similarly to an incompressible medium. Upon the basis of this fact it is, therefore, possible to use such as gas, in place of liquid media not only for qualitative, but also for quantitative measurements.

It is the object of the present invention to eliminate the aforementioned drawbacks of purely hydraulic test benches. To this end, therefore, a plant for the investigation of hydraulic machines, particularly water turbines and models thereof, under working conditions, is equipped, according to the invention, with a blower, with adjustable means for influencing the head and the quantity of medium flowing through and with a volume measuring device, the blower delivering air, drawn in from the surrounding atmosphere, through the parts to be investigated and also through the volume measuring device and this air escaping into the outer atmosphere again after flowing through the said parts.

If due regard be paid to the permissible limits for the velocities, it is possible, in such a plant, to operate hydraulic machines and models thereof under conditions which, as regards velocity, pressure and head, correspond exactly with those prevailing when actually working with water. Instead of a natural head of water a fixed difference of pressure of the air in front of and behind the machine to be investigated is employed. The speed of the air turbine will be higher than that of a corresponding water turbine, but can be so selected that the velocity diagrams in the model test and in reality are similar. In an air plant of this kind all the desired investigations in respect of quantity determinations of efficiency and of working characteristics and the like can be accurately carried out and the results transferred directly to water working. Under these circumstances such investigations become cheap, since air, for instance, is available in any desired quantity, everywhere, and is much lighter than water, which means that the mass to be set in circulation is smaller. The plant may also be so constructed as to permit any desired direction to be chosen for the shaft of the machine or model to be investigated; thus, even a horizontal arrangement of the machine or model is possible, which is most advantageous. If this latter arrangement be adopted, the whole installation can be so disposed that all the parts are easily accessible and pressure connections can be provided at any desired points. Changes in the plant to be investigated or in the part to be investigated, can also be made rapidly, because the whole plant is accessible from all sides and, therefore, can be easily put together and taken apart. Moreover, the quantities, velocities and pressures involved at different points can be measured much more easily and more accurately in airstreams than in currents of water. In the latter, at water velocities such as are here under consideration, measuring tubes are liable to disturbing vibrations, and air pockets in such tubes may easily falsify the results.

If required, different delivery volumes and different heads can in a plant of the kind above referred to, readily be produced with the aid of the adjustable means adapted for varying the speed of rotation and the blade setting in the blower, or for throttling the air in the circuit. If the blower comprises a single or multistage wheel of the axial-flow type equipped with blades which can be adjusted from outside while the blower is at work, an extremely rapid regulation of pressure and delivery can be obtained.

Further advantages secured are the possibility of governing effectively, and also the fact that a state of continuity or regularity for measuring purposes can be obtained almost instantaneously, in contradistinction to the conditions prevailing when working with water, which possesses great inertia.

For the sake of completeness it should also be mentioned that in investigations carried out with air, the blades of model wheels and other parts of a model plant can be made of wood or light metal, which further cheapens the investigations and also permits of high peripheral speeds, which, again, correspond to greater heads. For the same wheel dimensions, therefore, greater brake horsepower can be obtained.

The accompanying drawing shows, by way of example and more or less diagrammatically, two constructional forms of the subject matter of the invention.

Fig. 1 shows a plant in which air is drawn through the part to be investigated.

Fig. 2 shows on an enlarged scale and in section a detail of this plant.

Fig. 3 shows a plant in which air is forced through the part to be investigated.

In Fig. 1 the reference 1 denotes the guide apparatus and 2 the rotor wheel of the model of a water turbine. A water brake 3 is adapted to absorb the power developed by the rotor wheel 2. To the parts 1, 2 is connected a suction pipe 4 and to this latter a divergent pipe 5, this latter being connected to a compensating container 6. A device 7, for ordering and directing the airflow communicates through a bend 8 with the compensating container 6. The device 7 delivers to a volume measuring device comprising a nozzle or orfice 9 with a differential manometer 9a of conventional form for measuring the pressure drop across such nozzle or orifice. The compensating container 6 is merely a chamber of comparatively large capacity in which the air current flowing from the diffuser 5 loses its velocity to a considerable extent so that the air flowing to the nozzle or orifice 9 through the bend 8 flows with uniform velocity over the entire transverse area of the stream, a condition which is further enhanced by the action of the directing device 7. The effect of the compensating container 6 and the directing device 7 is to afford the necessary even flow velocity through the nozzle or orifice 9, to the end that accurate measurement of flow may be had. The numeral 10 denotes a multistage blower of axial flow type which serves as the means for circulating the air through the test apparatus. This blower is driven by a motor 11 through the driving belt 11'. The blades 30 of this blower 10 are adjustable. To permit such an adjustment being made, a lever 32 (Fig. 2) is secured to the journal 31 of each blade 30. A link 33 is connected to each lever 32, all links 33 being movably connected to an adjusting member 34. A ring 35 is mounted on the latter in such a way that it is free to rotate. The ring 35 can be moved on the shaft 37 of the blower in the axial direction of this shaft together with the adjusting member 34 by means of a fork-shaped member 36. This member 36 can be swung about a fixed pivot 38 and is movably connected at 39 with a spindle 40, which latter can be adjusted by hand. By means of an axial adjustment of the member 34 the blades 30 may be set into the desired position. The blower 10 has a suction pipe 12, constructed as a diffuser, and an exhaust pipe 13. Opposite the outlet of the pipe 13 a throttling device, in the form of an adjustable baffle plate 14 is disposed.

In the plant described, the axial blower 10 first draws air from the surrounding atmosphere, first through the guide apparatus 1 and the rotor wheel 2 of the model to be investigated and then through the pipes 4, 5, as indicated by the arrows A. The parts up to the delivery blower 10 and also this latter itself are thus under a pressure less than atmopsheric pressure. The compensating container 6 and the device 7 cooperate to compensate the velocity and direct the air drawn in by the blower 10, before it enters the measuring nozzle or orfice 9, so that this latter permits of accurate quantitative measurements being made. The arrangement described ensures that the admission to the turbine takes place in the perfectly uniform manner which is indispensable for accurate investigations.

The plant shown possesses also an adjustable water resistance 24 for regulating the speed of rotation of the motor 11 and thus also of the blower 10. By means of this resistance 24 and the described means for varying the blade setting of the blower 10 and with the aid, also, of the baffle plate 14 different deliveries and different heads can be obtained.

In the plant shown in Fig. 3 a multistage axial blower 15, driven by means of a belt drive 16¹ by a motor 16, is arranged in front of the part 17 to be investigated, in considering the direction of flow of the air delivered by the said blower. The air supplied by the blower flows to the part 17 in a spiral casing 18. A volume measuring device comprising a nozzle or orifice 19 with manometer 19a, is mounted at the entrance end of the air circuit and delivers to a compensating container 20 whose function is similar to that of the container 6 already described. Outflow from the container 20 is controlled by a throttling device which takes the form of an adjustable baffle plate 21 controlling communication between the compensating container 20 and the suction pipe 22 of the axial blower indicated at 15, generally similar to the blower 10 above described.

In this case air is drawn in by the axial blower 15 from the surrounding atmosphere, through the measuring nozzle or orifice 19 and the compensating container 20 in the direction of the arrow B and is then delivered through the part 17 to be investigated, and at 23 passes out again into the surrounding atmosphere.

By shifting the position of the baffle plate 21 different deliveries and different heads can be produced.

In order to economise power for driving the plant, the power supplied by the investigated turbine may be transmitted in the manner shown in Fig. 3 by a belt 25 wholly or in part to the driving shaft of the blower, so that useless dissipation of the power developed by the turbine 17 in the brake apparatus 26 may be avoided. With this arrangement the only power to be supplied from external sources in order to work the plant is an amount equivalent to the losses, i. e., the difference between the power absorbed in the blower and that delivered by the turbine.

What is claimed is:

1. A plant for the investigation of complete hydraulic machines, particularly water turbines or models thereof, under working conditions, said plant comprising in combination, means defining a flow path for air; means for mounting the machine to be investigated in said flow path in such manner that all of the air flowing through the path flows through the machine; means for imposing a definite load on said machine; a blower for circulating air through said flow path; means for driving said blower; adjustable means for varying the head and quantity of air flowing through said path; and means for measuring the volume of air flow through said path.

2. A plant for the investigation of complete hydraulic machines, particularly water turbines or models thereof, under working conditions, said plant comprising in combination, means defining a flow path for air; means for mounting the machine to be investigated in said flow path in such manner that all of the air flowing through the path flows through the machine; means for imposing a definite load on said machine; a blower for circulating air through said flow path; means for driving said blower; a throttling device for varying the head and quantity of air flowing through said path; and means for measuring the volume of air flow through said path.

3. A plant for the investigation of complete hydraulic machines, particularly water turbines or models thereof, under working conditions, said plant comprising in combination, means defining a flow path for air; means for mounting the machine to be investigated in said flow path in such manner that all of the air flowing through the path flows through the machine; means for imposing a definite load on said machine; a blower having adjustable blades; means for adjustably setting said blades; means for driving said blower; means for varying the speed at which said blower is driven; and means for measuring the volume of air flow through said path.

4. A plant for the investigation of complete hydraulic machines, particularly water turbines or models thereof, under working conditions, said plant comprising in combination, means defining a flow path for air; means for mounting the machine to be investigated in said flow path in such manner that all of the air flowing through the path flows through the machine; means for imposing a definite load on said machine; a blower for circulating air through said flow path; means for driving said blower; adjustable means for varying the head and quantity of air flowing through said path; means for measuring the volume of air flow through said path; and means for applying at least in part the energy output of the machine being investigated for driving said blower.

CURT KELLER.